Aug. 27, 1968  J. W. A. BRANT ET AL  3,398,736
APPARATUS FOR DETERMINING INSTANTANEOUS ACCELERATION OF
RECURRING BIOREGULATORY EVENTS
Filed April 15, 1964  2 Sheets-Sheet 1

JOHN W. A. BRANT
CHARLES T. HAGE
INVENTORS.

BY
BUCKHORN, BLORE, KLARQUIST & SPARKMAN
ATTORNEYS

United States Patent Office 3,398,736
Patented Aug. 27, 1968

3,398,736
APPARATUS FOR DETERMINING INSTANTANEOUS ACCELERATION OF RECURRING BIOREGULATORY EVENTS
John Weber Alexander Brant, 2100 SW. Ecole Ave., Beaverton, Oreg. 97006, and Charles T. Hage, Lancaster, Calif.; said Hage assignor to said Brant
Filed Apr. 15, 1964, Ser. No. 359,872
8 Claims. (Cl. 128—2.05)

The subject matter of the present invention relates generally to apparatus for determining the medical well-being of a biological organism, such as a human being or other warm blooded animal, by measuring the instantaneous acceleration of recurring bioregulatory events which control a body function of such organism, and in particular to electronic apparatus for automatically determining such instantaneous acceleration.

The apparatus of the present invention is especially useful in measuring the instantaneous acceleration of the output pulses of an electrocardiograph corresponding to the heart beats of a human being under extreme environmental stress, such as the pilot of a high speed aircraft. However, the present apparatus may also be employed to measure the instantaneous acceleration of breathing of a person or animal by connecting such apparatus to the output of a pneumotachograph, or the instantaneous acceleration of brainwaves by connecting it to an electroencephalograph, or of any other bioregulatory event which is capable of being indicated by an electrical pulse at the happening of such event.

Previously biologists and medical doctors have determined the well-being of humans and other warm blooded animals which regulate their internal body functions independently of their environments, as opposed to cold blooded animals, by measuring the number of heart beats of such animal over a long period of time and determining the average heart rate of such period. However, it has been discovered that if a warm blooded animal is to survive, the instantaneous acceleration of heart beats of such animal must be maintained within a critical range determined by a maximum positive acceleration and a maximum negative acceleration (or de-acceleration). Thus, for an entire time interval instantaneous rate and instantaneous acceleration give a moment-to-moment assessment of the variation of heart action, whereas a single average rate and a single average acceleration are inadequate to assess such action. In fact, such instantaneous heart acceleration assessment determines its own range, critical by statistical standards, and shows when that range is exceeded, whereas for the same time interval or averaging period the average rate and average acceleration reveal no moment-to-moment variation and may be little if at all affected by these extreme values which exceed the maximum permissible limits (range) for survival of the animal.

From the above, it can be seen that the apparatus and method of the present invention are superior to previous apparatus and methods employed to determine the well-being of a human or other warm blooded animal. Ideally, the instantaneous acceleration of each heart beat of the animal should be determined in order to provide a universe of values for determining its well-being during the entire interval of time under investigation. However, the large amount of apparatus and recording material necessary to enable continuous monitoring is often sufficient to make this impracticable when the monitoring takes place over a long duration of time. A statistical sampling technique may be employed to overcome this disadvantage and still determine instantaneous acceleration with a high degree of accuracy when the proper formulae are used. During the flight of a jet aircraft or guided missile portions of this flight are more dangerous than others, for example, the lift off time, atmosphere re-entry time and landing time of a space capsule are more dangerous than the orbiting time of such capsule. A higher sampling frequency can be employed during these more dangerous flight times than during orbiting to determine instantaneous acceleration in order to indicate the well-being of the astronaut at this time with a high degree of accuracy.

Briefly, one embodiment of the apparatus of the present invention includes a logic circuit for measuring the three time intervals between alternate ones of a sample group of five successive electrical wave forms produced by the heart beats of a human being in an electrocardiograph whose input electrodes are connected to such human being. Three ramp voltages are produced by linear ramp generator circuits within such logic circuit whose maximum voltages are proportional to these time intervals. The maximum ramp voltages are stored in peak memory circuits and later combined in a predetermined manner by other circuits in such logic circuit in accordance with certain formulae to produce two output voltages. One of these output voltages is proportional to the instantaneous rate of the third heart beat of such group and the other output voltage is proportional to the instantaneous acceleration of such third heart beat. These output voltages are transmitted to a recorder and may also be transmitted to indicating devices such as a pair of D.C. voltmeters whose dials are calibrated in terms of beats/second and beats/second$^2$, respectively, to indicate instantaneous heart rate and instantaneous heart acceleration.

It is, therefore, one object of the present invention to provide an apparatus and method for determining the well-being of a biological organism by measuring the instantaneous acceleration of recurring bioregulatory events which control a body function of such organism.

Another object of the present invention is to provide an electrical apparatus for determining the well-being of a human or other warm blooded animal by automatically measuring instantaneous acceleration of recurring bioregulatory events in such animal.

A further object of the present invention is to provide an electrical logic circuit for determining the instantaneous rate and instantaneous acceleration of occurrence of one of a group of electrical pulses in a simple and inexpensive manner.

An additional object of the invention is to provide an electrical apparatus automatically measuring instantaneous heart rate and instantaneous heart acceleration in an accurate and efficient manner.

Additional objects and advantages of the present invention will be apparent from the following detailed description of a preferred embodiment thereof, and from the attached drawings of which:

Figure 1:
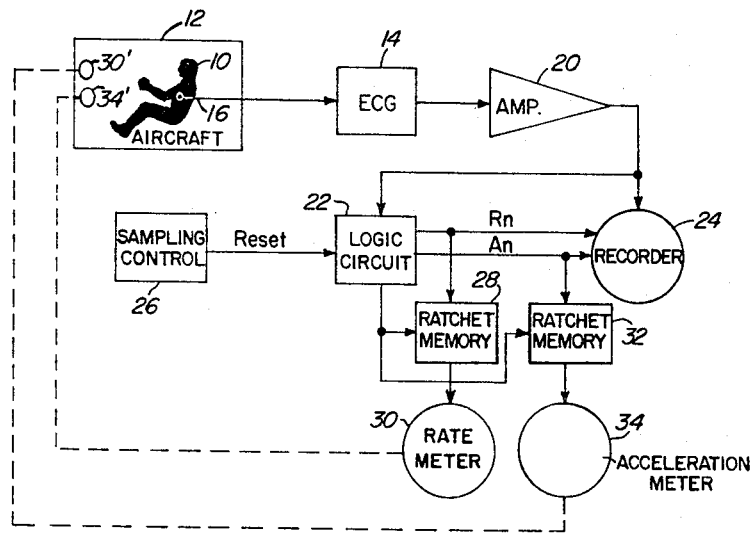
FIG. 1 is a block diagram of a system for monitoring the heart beat of the pilot of an aircraft in accordance with the present invention.
Figure 3:
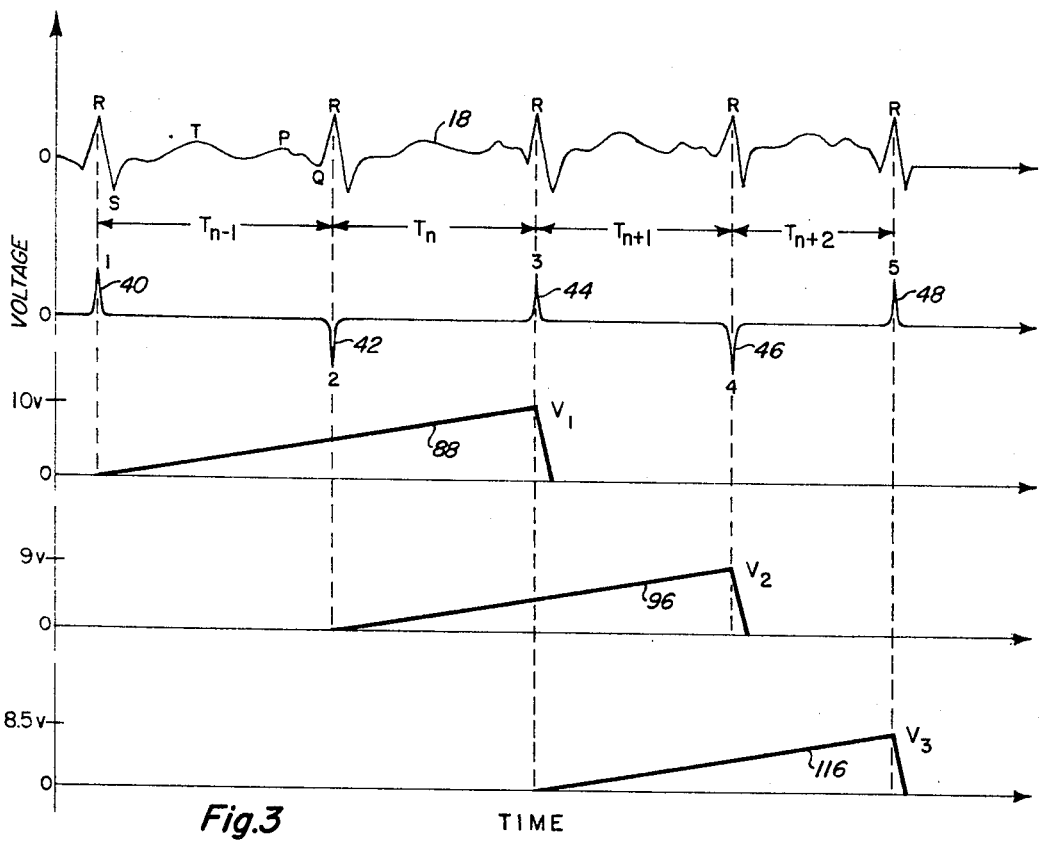
FIG. 3 shows a plurality of electrical signal wave forms produced by the apparatus of FIGS. 1 and 2 in time relationship to one another.

As shown in FIG. 1, one embodiment of the apparatus of the present invention may be employed to monitor the heart beat of a human being 10 piloting an aircraft 12, such as a jet airplane or a space satellite. An electrocardiograph 14 is connected to electrodes 16 positioned on the body of the pilot 10 in the proper location to transmit electrical signals corresponding to the heart beats of such pilot to the electrocardiograph. The electrocardiograph produces output signals 18 having the R–S–T–P–Q wave form shown in FIG. 3, and transmits such signals to an A.C. voltage amplifier 20. The output of the amplifier is connected to the inputs of a logic circuit 22 and a recorder 24. The recorder 24 may be a multichannel magnetic tape recorder, a multitrace cathode ray oscilloscope, pen recorder or other suitable recording device.

Figure 2:
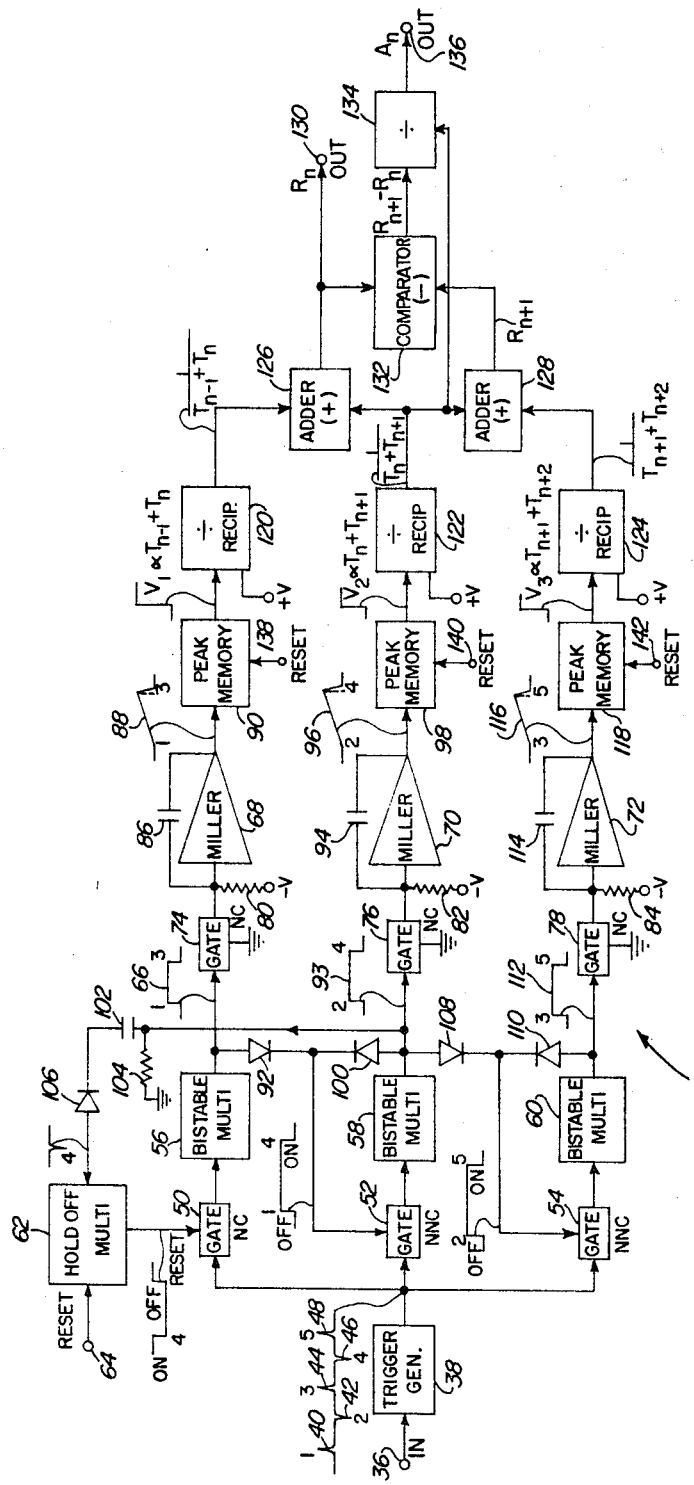
FIG. 2 is a schematic diagram of one embodiment of a logic circuit employed in the monitoring system of FIG. 1, which determines instantaneous heart rate and instantaneous heart acceleration in accordance with the present invention.

The logic circuit 22 which will be described in more detail with reference to FIG. 2, is conditioned for operation by applying an enabling or reset pulse thereto from a sampling control circuit 26, which controls the sampling frequency of the monitoring system. In a preferred embodiment of the logic circuit of the present invention, a group of five successive electrocardiograph signals are employed to determine the instantaneous heart rate and instantaneous heart acceleration of the third heart beat of such group in accordance with the following formulae:

$$R_n = \frac{1}{T_{n-1}+T_n} + \frac{1}{T_n+T_{n+1}} \quad \text{(Formula 1)}$$

$$A_n = \frac{R_{n+1}-R_n}{\frac{1}{2}(T_n+T_{n+1})} \quad \text{(Formula 2)}$$

and $$R_{n+1} = \frac{1}{T_n+T_{n+1}} + \frac{1}{T_{n+1}+T_{n+2}} \quad \text{(Formula 3)}$$

where $T_{n-1}$, $T_n$, $T_{n+1}$ and $T_{n+2}$ are the respective time intervals between the R portions of first, second, third, fourth and fifth electrocardiograph wave forms, $R_n$ and $R_{n+1}$ are the instantaneous heart rate of the third and fourth wave forms, and $A_n$ is the instantaneous heart acceleration of the third wave form.

The $R_n$ voltage output signal of the logic circuit 22 is transmitted to recorder 24 and to a ratchet memory circuit 28 which stores such rate voltage and produces it as a step voltage of a stairstep output signal. The stairstep output signal of ratchet memory 28 is applied to an indicating device, such as a heart rate meter 30, which may be nothing more than a D.C. voltmeter whose dial is calibrated in terms of heart beats per second. The rate meter 30 can be located within the cockpit of the aircraft 12 as meter 30' so that it is visible to the pilot 10 to enable him to control the aircraft accordingly. The ratchet memory 28 is employed so that the needle of the rate meter 30 moves small distances equal to the voltage difference between successive heart rate voltages and does not swing back and forth between zero and the heart rate voltage each time a reset pulse is transmitted from the sampling control circuit 26 to the logic circuit 20, in order to make such rate meter easier to read.

The logic circuit 22 also produces an output signal $A_n$ whose voltage is proportional to the instantaneous acceleration of the third pulse in the sample group of pulses. This acceleration voltage is transmitted to recorder 24 and to a second ratchet memory circuit 32 to produce a stairstep output signal whose voltage steps correspond to successive acceleration voltages. The stairstep output voltage of ratchet memory 32 is applied to a heart acceleration meter 34 which may be a D.C. voltmeter having its dial calibrated in terms of beats per second with a zero acceleration position in the middle of the meter dial. The acceleration meter may also be positioned within the cockpit of the aircraft 12 as meter 34' so that it is visible to the pilot to enable him to control the flight of the aircraft according to the readings of such acceleration meter.

The logic circuit 22 of FIG. 1 is shown in greater detail in FIG. 2 and includes an input terminal 36 which is connected to the output of amplifier 20 of FIG. 1 so that the electrocardiograph signals 18 are applied to a trigger generator circuit 38 connected to such input terminal. The trigger generator circuit produces five alternately positive and negative output pulses 40, 42, 44, 46 and 48 which each correspond in time to a different one of five successive electrocardiograph (ECG) wave forms 18. The trigger generator 38 may be set to be triggered by the R portions of the ECG wave forms so that all of the output pulses 40, 42, 44, 46 and 48 correspond in time to the same R portion of the first, second, third, fourth and fifth wave forms, respectively. Thus, the time between the positive first output pulse 40 and the negative second output pulse 42 is equal to the interval $T_{n-1}$ between the R portions of the first and second ECG wave forms. Similarly, the time between the second output pulse 42 and the positive third output pulse 44 is equal to the interval $T_n$ between the R portions of the second and third ECG wave forms. Likewise, the time between the third output pulse 44 and the negative fourth output pulse 46 is equal to the interval $T_{n+1}$ between the R portions of the third and fourth ECG wave forms. Similarly, the time between the fourth output pulse 46 and the positive fifth output pulse 48 is equal to the interval $T_{n+2}$ between the R portions of the fourth and fifth ECG wave forms.

The output of the trigger pulse generator 38 is connected to the inputs of three gating devices 50, 52 and 54 whose outputs are connected, respectively, to the inputs of three bistable multivibrators 56, 58 and 60 provided in three separate channels of the logic circuit. The output of a bistable hold-off multivibrator 62 is connected to the control terminal of the first gate 50 so that the output signal of such hold-off multivibrator opens and closes such gate. A reset pulse is applied to the hold-off multivibrator 62 by the sampling control circuit 26 of FIG. 1 connected to a reset input terminal 64 in order to turn "on" gate 50 so that such gate is rendered normally conducting when a sample is being taken. This enables the first output pulse 40 of the trigger generator 38 to be transmitted through gate 50 to trigger multivibrator 56 to a high voltage stable state and produce the leading edge of a positive rectangular gating pulse 66 at the output of such multivibrator.

Three Miller integrator type ramp voltage generator circuits 68, 70 and 72 are provided with their inputs connected, respectively, to three gates 74, 76 and 78. These ramp gates are normally biased conducting to cause the current flowing through timing resistors 80, 82 and 84 of the same value from the negative D.C. voltage sources connected to such timing resistors, to normally flow to ground through such gates. The output of the first multivibrator 56 is connected to the control terminal of ramp gate 74 so that such gate is rendered nonconducting when the positive gating pulse 66 is applied thereto. This causes the current flowing through timing resistor 80 to flow through a feedback capacitor 86 connected between the input and output of the Miller integrator 68, to produce a positive going ramp voltage 88 at the output of such Miller integrator whose leading edge has an extremely linear slope. The first multivibrator 56 is reverted to its low voltage stable state by the third output pulse 44 of the trigger generator to terminate the gating pulse 66 and render gate 74 again conducting. This causes the charging current flowing through resistor 80 to again flow through gate 74 to ground, rather than through capacitor 86, so that the leading edge of the ramp voltage 88 terminates at that time and such ramp voltage decreases rapidly in value to its initial voltage of approximately zero volts. It should be noted that the negative second output pulse 42 of trigger generator does not revert multivibrator 56 because such multivibrator is connected so that only positive voltage pulses can trigger and revert such multivibrator. Also the maximum positive voltage of ramp voltage 88 is stored in a peak memory circuit 90 connected to the output of the Miller integrator 68. This peak voltage $V_1$ is proportional to the time $T_{n-1}+T_n$ between the first and third output pulses 40 and 44 because of the linear slope of ramp voltage 88.

The output of bistable multivibrator 56 is connected through a diode 92 to the control terminal of gate 52 in order to render such gate conducting by the positive going leading edge of output gating pulse 66. The gating pulse 66 is produced at a time shortly after the first output pulse 40 is applied to the input of gate 52 and the second output pulse 42 is transmitted through such gate to trigger the second multivibrator 58 to a high voltage stable state. This produces a second positive rectangular gating pulse 93 at the output of multivibrator 58 which renders gate 76 nonconducting and causes the current flowing through timing resistor 82 to charge a feedback capacitor 94 of Miller integrator 70. As a result, a second ramp voltage 96 is produced at the output of the Miller integrator 70 having a linear leading edge which starts at a time corresponding to the second output pulse 42 and ends at a time corresponding to the fourth output pulse 46 since such fourth output pulse reverts multivibrator 58 and terminates gating pulse 93. The peak voltage $V_2$ of ramp signal 96 is stored in a peak memory circuit 98 having its input connected to the output of Miller integrator 70 and such peak voltage is proportional to the time interval $T_n + T_{n+1}$ between the second and fourth output pulses.

The gating pulse 93 is transmitted through a diode 100 to the control terminal of gate 52 so that such gate is rendered nonconducting by the trailing edge of such gating pulse. Thus, gate 52 is turned "on" by the positive going leading edge of gating pulse 66 and is turned "off" by the negative going trailing edge of gating pulse 93, so that only the second, third and fourth output pulses 42, 44 and 46 are transmitted through such gate to multivibrator 58. The third output pulse 44 does not revert multivibrator 58 because such multivibrator is connected to be triggered and reverted by only negative voltage pulses. It should be noted that diodes 92 and 100 are connected together of opposite polarity so that gating pulse 66 is not transmitted through diode 100 and gating pulse 93 is not transmitted through diode 92, to enable the Miller integrator gates 74 and 76 to be rendered nonconducting for the proper time.

The gating pulse 93 is also transmitted through a differentiating circuit including a coupling capacitor 102 and a shunt resistor 104 connected to ground in order to produce a positive spike pulse corresponding to the leading edge and a negative spike pulse corresponding to the trailing edge of such gating pulse. A diode 106 is connected between capacitor 102 and an input of hold-off multivibrator 56 with a porality to pass only the negative going spike corresponding to the fourth trigger pulse 46 produced by the trailing edge of gating pulse 93 in order to trigger such hold-off multivibrator to a low voltage stable state. Since the output of the hold-off multivibrator 56 is connected to the control terminal of gate 50, the negative going output voltage of such multivibrator turns such gate "off" at a time corresponding to the fourth trigger pulse 46. This prevents the fifth trigger pulse and any other subsequent positive trigger pulses from triggering multivibrator 56 until a second reset pulse is applied to reset terminal 64 by the sampling control circuit 26 to revert the hold-off multivibrator and turn "on" gate 50.

The third channel of the logic circuit 22 including gate 54, bistable multivibrator 60, gate 78 and Miller integrator 72, operates in a similar manner to the two channels previously described. The control terminal of gate 54 is connected through a diode 108 with the output of multivibrator 58 and through a diode 110 to the output of multivibrator 60 so that such gate is rendered conducting by the leading edge of the gating pulse 93. This enables the third trigger pulse 44 to trigger multivibrator 60 and the fifth trigger pulse 48 to revert such multivibrator and produce a positive rectangular gating pulse 112. As a result, the trailing edge of gating pulse 112 turns gate 54 "off" when such pulse is transmitted through diode 110. This gating pulse 112 is also applied to ramp gate 78 to render such gate nonconducting so that the current flowing through timing resistor 84 of Miller integrator 72 now charges a feedback capacitor 114 of such integrator circuit to produce a ramp voltage 116 at the output of such integrator circuit. The linear leading edge of ramp voltage 116 starts positive at a time corresponding to the third output pulse 44 and stops at a time corresponding to the fifth output pulse 48 to produce a peak voltage $V_3$ proportional to the time interval $T_{n+1} + T_{n+2}$ between the third and fifth output pulses. This peak voltage is stored in a peak memory circuit 118 having its input connected to the output of Miller integrator 72.

The output voltages of the peak memory circuits 90, 98 and 118 are each transmitted through reciprocal division circuits 120, 122 and 124, respectively, which divide such output voltages into a constant voltage to produce a reciprocal voltage which is proportional to the reciprocal of the corresponding time intervals. The reciprocal voltages of division circuits 120 and 122 are transmitted to an adder circuit 126 which combines such reciprocal voltages to produce a sum voltage which is proportional to the sum of the reciprocals $$\frac{1}{T_{n-1}+T_n} + \frac{1}{T_n+T_{n+1}}$$

Thus, the sum voltage produced at the output of adder 126 is proportional to the instantaneous heart rate $R_n$ of the third heart beat. In a similar manner, the reciprocal voltages of division circuits 122 and 124 are combined in an adder circuit 128 to produce a sum voltage which is proportional to the sum of the reciprocals $$\frac{1}{T_n+T_{n+1}} + \frac{1}{T_{n+1}+T_{n+2}}$$

Thus the sum voltage produced at the adder circuit 128 is proportional to the instantaneous heart rate $R_{n+1}$ of the fourth heart beat.

The sum voltage at the output of adder circuit 126 is transmitted to an output terminal 130 of the logic circuit in order to provide an output voltage proportional to the heart rate $R_n$. The output of adder circuit 126 is also connected to a comparator circuit 132 along with the output of adder circuit 128 in order to produce a difference signal at the output of such comparator circuit whose voltage is proportional to $R_{n+1} - R_n$. This difference voltage is transmitted to the input of a division circuit 134 along with the reciprocal voltage produced at the output of division circuit 122. The division circuit 134 produces an output voltage proportional to the $$\frac{R_{n+1} - R_n}{\frac{1}{2}(T_n + T_{n+1})}$$

which is equal to the instantaneous acceleration $A_n$ of the third heart beat and transmits such acceleration voltage to another output terminal 136 of the logic circuit. Thus, the logic circuit of FIG. 2 produces two output signals which are proportional to the instantaneous heart rate $R_n$ and the instantaneous acceleration $A_n$ of the third heart beat wave form.

The voltages of the peak memory circuits 90, 98 and 118 are returned to zero by applying a reset pulse from the sampling control circuit 26 to the reset terminals 138, 140 and 142, respectively, of such memory circuits when the next sample is to be taken. This reset does not effect the output voltages of the ratchet memory circuits 28 and 32 of FIG. 1 because such ratchet memory circuits each include a normally nonconducting memory gate (not shown) which is rendered briefly conducting by the trailing edge of the gating pulse 112 of multivibrator 60, but is again rendered nonconducting before the application of the reset pulses to the peak memory circuits.

From the above it will be apparent that the monitor system of FIGS. 1 and 2 will automatically produce output signals whose voltages are proportional to the instantaneous rate and instantaneous acceleration of selected ones of the heart beats of the pilot 10. The frequency of sampling may be set to different predetermined values and controlled automatically by the sampling control circuit 26 to take samples at a constant frequency. However, the sampling control circuit may be programmed to take a greater number of samples during critical portions of the flight, such as during take-off and landing. In addition, it should be noted that the heart beat of the pilot 10 may be continuously monitored to determine the instantaneous rate and instantaneous acceleration of each heart beat by employing five separate logic circuits similar to circuit of FIG. 2.

It will be obvious to those having ordinary skill in the art that many changes may be made in the details of the above described preferred embodiment of the present invention without departing from the spirit of the invention. For example, the apparatus of FIGS. 1 and 2 could be employed for measuring the instantaneous acceleration of other recurring bioregulatory events than heart beats and the electrical signals corresponding to such events can be first recorded and then transmitted to the logic circuit from the recorder. Therefore, the scope of the present invention should only be determined by the following claims.

We claim:
1. Electrical apparatus, comprising:
   means for generating a plurality of electrical pulses each corresponding in time to the occurrence of a different one of a plurality of successive bioregulatory events of a similar nature in the body of a living organism;
   means for producing interval voltages whose amplitudes are proportional to the time intervals between predetermined ones of said pulses; and
   means for selectively combining said interval voltages to produce an acceleration signal whose voltage is proportional to the instantaneous acceleration of occurrence of one of said events.
2. Electrical apparatus, comprising:
   means for generating a plurality of electrical pulses each corresponding in time to the occurrence of a different one of a plurality of successive physiological events of a similar nature in the body of a living animal which regulate a function of said body;
   means for producing interval voltages whose amplitudes are proportional to the time intervals between predetermined ones of said pulses;
   means for selectively combining said interval voltages to form a plurality of rate signals whose voltages are proportional to the instantaneous rates of occurrence of certain successive ones of said events;
   means for selectively combining said interval voltages and said rate signals to produce an acceleration signal whose voltage is proportional to the instantaneous acceleration of occurrence of one of said certain events; and
   means responsive to said acceleration signal to indicate the value of said instantaneous acceleration.
3. Electrical monitoring apparatus, comprising:
   sensor means for transmitting from the body of a living animal a plurality of electrical input signals each corresponding in time to the occurrence of a different one of a group of successive physiological events of a similar nature in said body which regulate a function of said body;
   ramp generator means for producing ramp signals whose maximum voltages are proportional to the time intervals between predetermined ones of said input signals;
   memory means for storing interval voltages corresponding to the maximum voltages of said ramp signals;
   means for selectively combining said interval voltages to form a plurality of rate signals whose voltages are proportional to the instantaneous rates of occurrence of certain successive events of said group;
   means for selectively combining said interval signals and said rate signals to produce an acceleration signal whose voltage is proportional to the instantaneous acceleration of occurrence of one of said certain events; and
   means responsive to said acceleration signal to indicate the value of said instantaneous acceleration.
4. Heart beat monitoring apparatus, comprising:
   means for generating a plurality of electrical pulses each corresponding in time to the occurrence of a different one of a plurality of successive heart beats of a warm blooded animal;
   voltage generator means for producing interval voltages whose amplitudes are proportional to the time intervals between alternate ones of a sample group of said pulses;
   memory means for storing said interval voltages;
   means for selectively combining said interval voltages to form a plurality of rate signals whose voltages are proportional to the instantaneous rates of occurrence of certain successive events of said group;
   means for selectively combining said interval voltages and said rate signals to produce an acceleration signal whose voltage is proportional to the instantaneous acceleration of occurrence of one of said certain events; and
   sampling means for resetting said memory means to its initial voltage level and for enabling said voltage generator means to produce other interval voltages corresponding to another sample group of said pulses.
5. Electrical apparatus, comprising:
   means for generating at least five electrical pulses each corresponding in time to the occurrence of a different one of a group of five successive physiological events of a similar nature which regulate a function in a warm blooded animal;
   means for producing interval voltages whose amplitudes are proportional to the time intervals $T_{n-1}$, $T_n$, $T_{n+1}$, $T_{n+2}$ between the successive ones of said pulses;
   means for combining said interval voltages in accordance with the formulae

$$R_n = \frac{1}{T_{n-1}+T_n} + \frac{1}{T_n+T_{n+1}}$$

$$R_{n+1} = \frac{1}{T_n+T_{n+1}} + \frac{1}{T_{n+1}+T_{n+2}}$$

of rate signals whose voltages are proportional to the instantaneous rates $R_n$, $R_{n+1}$ of occurrence of the third and fourth events, respectively, of said group; and
   means for combining said interval voltages in accordance with the formula $$A_n = \frac{R_{n+1}-R_n}{\frac{1}{2}(T_n+T_{n+1})}$$

and said rate signals to produce an acceleration signal whose voltage is proportional to the instantaneous acceleration $A_n$ of the third of said certain events.
6. Electrical apparatus, comprising:
   means for generating a plurality of electrical pulses each corresponding in time to the occurrence of a different one of a plurality of successive physiological events of a similar nature in the body of a living animal which regulate a function of said body;
   means for producing interval voltages whose amplitudes are proportional to the time intervals $T_{n-1}$, $T_n$, $T_{n+1}$, $T_{n+2}$ between predetermined ones of said pulses;
   means for selectively combining said interval voltages in accordance with the formulae $$R_n = \frac{1}{T_{n-1}+T_n} + \frac{1}{T_n+T_{n+1}}$$

$$R_{n+1} = \frac{1}{T_n+T_{n+1}} + \frac{1}{T_{n+1}+T_{n+2}}$$

to form a plurality of rate signals whose voltages are proportional to the instantaneous rates $R_n$, $R_{n+1}$ of occurrence of certain successive ones of said events;

means for selectively combining said interval voltages in accordance with the formula $$A_n = \frac{R_{n+1} - R_n}{\frac{1}{2}(T_n + T_{n+1})}$$

and said rate signals to produce an acceleration signal whose voltage is proportional to the instantaneous acceleration $A_n$ of occurrence of one of said certain events; and means responsive to said acceleration signal to indicate the value of said instantaneous acceleration.

7. Electrical monitoring apparatus, comprising:

sensor means for transmitting from the body of a living animal a plurality of electrical input signals each corresponding in time to the occurrence of a different one of a group of successive physiological events of a similar nature in said body which regulate a function of said body;

ramp generator means for producing ramp signals whose maximum voltages are proportional to the time intervals $T_{n-1}$, $T_n$, $T_{n+1}$, $T_{n+2}$ between predetermined ones of said input signals;

memory means for storing interval voltages corresponding to the maximum voltages of said ramp signals;

means for selectively combining said interval voltages in accordance with the formulae $$R_n = \frac{1}{T_{n-1} + T_n} + \frac{1}{T_n + T_{n+1}}$$

$$R_{n+1} = \frac{1}{T_n + T_{n+1}} + \frac{1}{T_{n+1} + T_{n+2}}$$

to form a plurality of rate signals whose voltages are proportional to the instantaneous rates $R_n$, $R_{n+1}$ of occurrence of certain successive events of said group;

means for selectively combining said interval signals in accordance with the formula $$A_n = \frac{R_{n+1} - R_n}{\frac{1}{2}(T_n + T_{n+1})}$$

and said rate signals to produce an acceleration signal whose voltage is proportional to the instantaneous acceleration $A_n$ of occurrence of one of said certain events; and means responsive to said acceleration signal to indicate the value of said instantaneous acceleration.

8. Heart beat monitoring apparatus, comprising:

means for generating a plurality of electrical pulses each corresponding in time to the occurrence of a different one of a plurality of successive heart beats of a warm blooded animal;

voltage generator means for producing interval voltages whose amplitudes are proportional to the time intervals $T_{n-1}$, $T_n$, $T_{n+1}$, $T_{n+2}$ between alternate ones of a sample group of said pulses;

memory means for storing said interval voltages;

means for selectively combining said interval voltages in accordance with the formulae $$R_n = \frac{1}{T_{n-1} + T_n} + \frac{1}{T_n + T_{n+1}}$$

$$R_{n+1} = \frac{1}{T_n + T_{n+1}} + \frac{1}{T_{n-1} + T_{n+1}}$$

to form a plurality of rate signals whose voltages are proportional to the instantaneous rates $R_n$, $R_{n+1}$ of occurrence of certain successive events of said group;

means for selectively combining said interval voltages in accordance with the formula $$A_n = \frac{R_{n+1} - R_n}{\frac{1}{2}(T_n + T_{n+1})}$$

and said rate signals to produce an acceleration signal whose voltage is proportional to the instantaneous acceleration $A_n$ of occurrence of one of said certain events; and sampling means for resetting said memory means to its initial voltage level and for enabling said voltage generator means to produce other interval voltages corresponding to another sample group of said pulses.

References Cited

UNITED STATES PATENTS

| | | | |
|---|---|---|---|
| 2,534,712 | 12/1950 | Gray. | |
| 3,051,165 | 8/1962 | Kompelien | 128—2.05 |
| 3,126,886 | 3/1964 | Karsh | 128—2.05 |
| 3,267,933 | 8/1966 | Mills et al. | 128—2.06 |
| 3,267,934 | 8/1966 | Thornton | 128—2.06 |

RICHARD A. GAUDET, *Primary Examiner.*

SIMON BRODER, *Assistant Examiner.*